United States Patent

[11] 3,543,933

| [72] | Inventor | Peter Karter |
| | | York, Pennsylvania |
| [21] | Appl. No. | 713,537 |
| [22] | Filed | March 15, 1968 |
| [45] | Patented | Dec. 1, 1970 |
| [73] | Assignee | American Machine & Foundry Co. |
| | | a corporation of New Jersey |
| [32] | Priority | Oct. 20, 1967 |
| [33] | | Great Britain |
| [31] | | Nos. 47845/67, 47846/67, 47847/67 and 47848/67 |

[54] PROCESS AND APPARATUS FOR SEPARATING LIQUIDS AND SOLIDS
4 Claims, 5 Drawing Figs.

[52] U.S. Cl. .................................................. 210/83,
210/83, 210/261, 210/298, 210/332
[51] Int. Cl. ....................................................... B01d 21/04,
B01d 23/06
[50] Field of Search ........................................... 210/73, 83,
79, 261, 262, 298, 332, 340, 433

[56] References Cited
UNITED STATES PATENTS

| 1,028,304 | 6/1912 | Tourangeau ................. | 210/433UX |
| 2,582,401 | 1/1952 | Stinson ........................ | 210/262X |
| 2,815,364 | 12/1957 | Green ........................... | 210/433X |
| 3,042,214 | 7/1962 | Arvanitakis ................. | 210/298X |
| 3,423,313 | 1/1969 | Messer ......................... | 210/73X |

FOREIGN PATENTS

| 520,987 | 7/1955 | Belgium ....................... | 210/433 |

Primary Examiner—John Adee
Attorney—George W. Price and Thomas M. Hammond

ABSTRACT: This invention is for a process apparatus for separating solids and liquids by gravity filtration while utilizing flocculation and/or precipitation of the solids as an auxiliary self-filtering means. Generally the apparatus covers a plurality of open ended filtering tubes having collection means for the filtrate and the separated solids associated therewith.

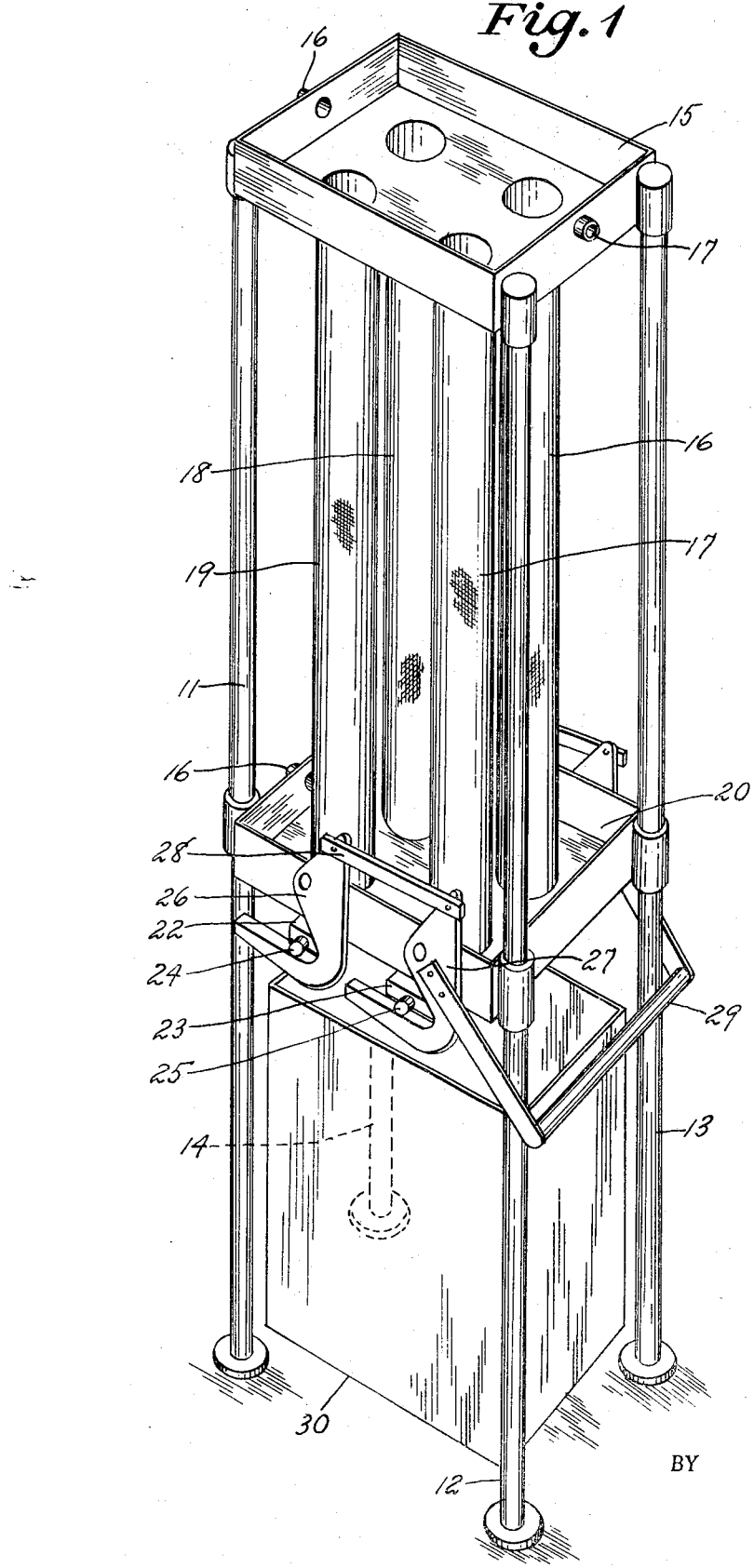

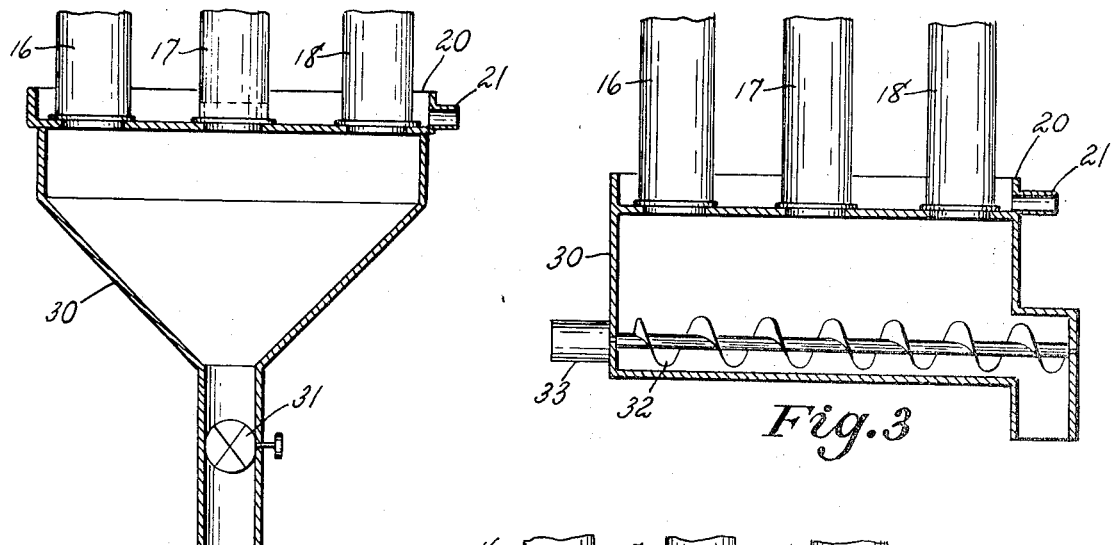
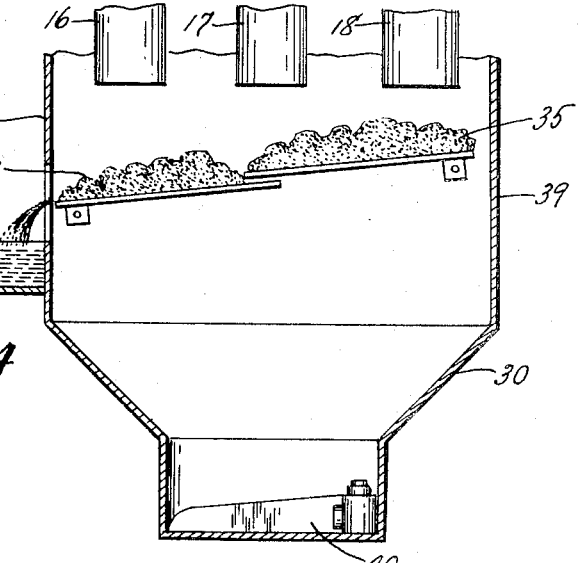
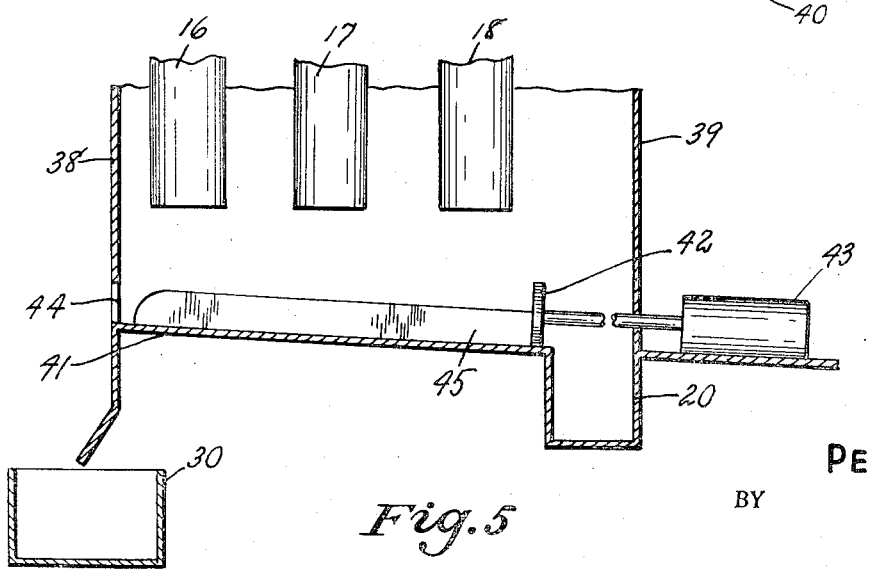

3,543,933

PROCESS AND APPARATUS FOR SEPARATING LIQUIDS AND SOLIDS

This invention relates to a process and apparatus for separating solids and liquids. More particularly the invention relates to a process and apparatus for removing solids from liquid streams by gravity filtration while utilizing sedimentation, flocculation and/or precipitation of the solids as an auxiliary self-filtering medium in the operation of the process.

Various processes for removal of solids from liquids as well as apparatus for carrying out these processes are known. However, most of the known processes and apparatus present disadvantages in that they are relatively complicated and generally are not suitable for separation of liquids and solids in varying degrees of completion or to a degree resulting in substantially complete separation. The present invention overcomes these disadvantages and provides both a flexible process and flexible apparatus suitable for separating solid material and liquid streams in a relatively uncomplicated manner with relatively simple equipment systems which are easy to construct and utilize and which result in varying degrees of separation of solids and liquid material, that is, either partial separation or substantially complete separation.

Although the invention can be applied to a wide variety of materials where it is desirable to separate solids and liquids, it is disclosed herein, for the sake of simplicity, as it applies to dewatering of sludge which is a waste product in many areas of industry such as paper mills, chemical plants and sewage plants and the like.

In general, the present process comprises introducing an aqueous sludge or the like from one or more sources into a collection zone, passing the material from the collection zone through a filtering zone, retaining the solids within the filtering zone and permitting the water, which may include other liquids, to pass through the filtering zone, separating at least part of the water from the solids which sedimentate, flocculate and precipitate in the filtering zone forming an auxiliary self-filtering medium, collecting the separated liquid in a collection zone and collecting the separated solid material in a separate collection zone.

The process may be operated in a batch continuous or semicontinuous manner and the rate of separation of solids from liquid depends upon a number of factors including the solids content of the raw waste, the desired rate of processing, the desired dryness of the solids and the like, as well as the number of filter bags or tubes employed.

The entire process is carried out at ambient conditions of pressure and temperature, the separation depending only on gravity. However, in those cases where it is necessary, the temperature of a material being processed can be raised to a point up to the decomposition temperature of the material when such temperature increase does not affect the fluidity of the material.

Apparatus for carrying out the present process comprises generally means for collecting aqueous sludge or like material into at least one and preferably a plurality of vertically disposed filter tubes, said means being located in the vicinity of the upper end of the filter tubes collection means for the separated liquid being disposed in the vicinity of the lower ends of the filter tubes and a separate collection means for solid material separated from the liquid being located in the vicinity of the lower end of the filter tubes to retain the solid material so separated.

In order to understand the present invention more completely, reference is made to the attached drawings wherein:

FIG. 1 is an elevation view in perspective of an apparatus according to the invention and having closure means provided at the lower end of the filter tubes;

FIG. 2 is a partial view in elevation of a different embodiment of the invention showing the solid collecting means equipped with a valve;

FIG. 3 is a partial view in elevation showing another embodiment of the solid collecting means equipped with a screw conveyor;

FIG. 4 is a partial view in elevation showing the solid collecting means and including dump chutes and a scraper for conveying the solids; and FIG. 5 is a partial view in elevation of another embodiment of the solid retaining means showing a ram for conveying the solids.

Referring more particularly to FIG. 1 the apparatus illustrated there comprises four upright support members 11, 12, 13 and 14. Disposed near the top of the support members and suitably supported thereby is a trough 15 equipped with an entry pipe 16 and an overflow pipe 17. The overflow pipe leads to an overflow gravity return system (not shown). Disposed vertically from the bottom of trough 15 through openings therein are filter bags or tubes 16, 17, 18 and 19, terminating in open upper and lower ends.

The filter bags or tubes can be made of any suitable material so long as it has necessary strength while at the same time providing the required filtering action. Generally, the filters are made of cotton or other natural fibrous material or synthetic fibrous material formed into a suitable fabric. The filter bags or tubes are, however, preferably made of woven fabric. Although the particular weave structure can be varied greatly, it is preferably one which is woven in a suitable fashion such that it freely permits liquid to pass through while being tight enough to prevent the passage of solid material. The filter bags or tubes extend downwardly terminating in open lower ends. Near the lower ends of the filter bags or tubes a trough 20 is suitably supported on the four upright members 11, 12, 13 and 14. The trough is equipped with an outlet pipe 21 which carries collected filtrate to a gravity return system (not shown) or to disposal or storage. The lower ends of the filter tubes project through the opening in the trough.

At their upper and lower ends, the filter bags or tubes are equipped with rubber retaining rings (not shown) or other suitable means in order that they may be tightly sealed to prevent leakage of solid material therefrom.

The embodiment of FIG. 1 includes a closure mechanism comprising longitudinal flat metal members which are sufficiently wide to come into complete contact with and cover the rubber retaining rings or other means on the bottom of the filter bags or tubes. In the apparatus shown, each flat metal member covers and closes two tubes. These longitudinal pieces of metal are designated by numerals 22 and 23 and are provided on each end with bosses 24 and 25.

Pivoted to two sides of trough 20 are cam locks 26 and 27 joined together by connecting bar 28, only one side being illustrated. Cam locks 26 and 27 are actuated by operating lever 29 which is connected in a suitable manner to cam lock 27. As can be seen from FIG. 1, bosses 24 and 25 ride on the surfaces of cam locks 26 and 27. Accordingly, when the cam locks are actuated by the operating lever, depending upon the direction of actuation, the bosses are either moved upwardly or downwardly, thereby permitting the flat metallic closure members 22 and 23 to be urged against the bottom of the filter bags or tubes to close them or withdraw them from their closed position, thus permitting the bags or tubes to be opened. Disposed beneath trough 20 is a drum or hopper 30 suitable for collecting solid material as it drops from the filter bags or tubes.

The embodiment shown in FIG. 2 is particularly well adapted to the treatment of water containing a relatively large amount of solid material. This particular embodiment eliminates the closure mechanism of FIG. 1. In contrast, the solids collecting means or tank 30 is joined directly to the bottom of the filtrate collecting means on trough 20 and solid material as well as liquid material is permitted to pass through the filter tubes 16, 17 and 18 and into the solids collecting tank directly. As the material being treated passes through the filter tubes, some of the liquid will be filtered off, streaming down the outside of the tubes and into the trough, the remainder falling through the tubes with the solid material into the collection tank. As the amount of material in the collection tank builds up to a point where it fills the tank, the material then begins to build up within the filter tubes themselves and advantage is taken of the sedimentation, flocculation and precipitation of the solids in the tubes to bring about a more complete separation. In this embodiment the solids collection tank 30 is equipped with a valve 31 which can be opened when desired to permit that tank to be emptied, the contents thereof being either recycled for further treatment, stored or disposed of. In this embodiment, when the amount of solids material builds up in the collection tank and then in the tubes, a separation of solids and liquid takes place until the tubes are completely filled. At this point the valve can then be opened and the material in the collection tank can be removed; or if desirable, the valve can be partially opened and material can undergo a continuous removal at a rate such that the tubes never become full. In this manner, a completely continuous operation can be carried out.

In FIG. 3 there is illustrated an embodiment wherein a screw conveyor 32 powered from a source 33 is employed to move the solids material from the collection tank to recycle, storage or disposal.

FIG. 4 shows an embodiment wherein sloping or inclined dump chutes 34 and 35 are employed to catch both the solid and liquid material as it falls through the tubes. The dump chutes are hinged as shown at 36 and 37 in any suitable fashion to side wall support members 38 and 39 so that they can be opened and permit the solids material collected thereon to fall into the collection tank provided below the dump chutes. The collection tank is equipped with a scraper bar or like means 40 for moving the material out through an opening (not shown) in the side of the tank so that it can be transported to storage or disposed of. It is to be noted that the sloping of the dump chutes in their closed position forms a surface which allows the liquid to flow therefrom and into the liquid collecting means, the solid material being less fluid and thereby retained to a large extent on the surface of the dump chutes and collected there for transfer to the solid collecting means.

Although the embodiment shown in FIG. 5 is somewhat similar in that an inclined surface 41 similar to the dump chutes is employed, this surface is not movable or hinged, the liquid coming in contact therewith flowing off in the direction of the inclined surface, the solids being retained thereon, after which a ram 42 which can be operated hydraulically, as generally shown at 43, or by any other suitable means, is moved in the direction of the high end of the inclined surface so that the solid material collected on the surface is pushed over it to the high side where it is pushed off through opening 44 and into the solid collection means located there. The inclined surface is also equipped with a guide bar 45 to guide the ram.

As mentioned hereinabove the process and apparatus of this invention can be operated in batch semicontinuous and continuous procedures. Briefly, the process is carried out by introducing material to be processed into the trough located at the top of the vertically disposed filter tubes and thence through the filter tubes. As the material passes downwardly by gravity through the filter tubes, the solids sedimentate, flocculate and precipitate thereby forming an auxiliary filter and the liquid passes through the filter tubes flowing down the outside thereof and being collected in the trough located near the bottom of the filter tubes. The solids which have collected in the filter tubes is then permitted to fall into the solid collecting chamber where it is either removed by opening the valve of the device particularly illustrated in FIG. 2 or with the conveying screw as shown in FIG. 3 or the scraper means or ram shown in FIGS. 4 and 5 respectively. It will be evident that the embodiments shown in FIGS. 2 through 5 lend themselves very well to either batch semicontinuous or continuous operation. On the other hand, the apparatus of FIG. 1 is most beneficially employed when carrying out a batch operation since the closure described hereinabove retains all solid material within the tubes until filtration is complete after which it is opened to permit collection of the solid material in a collecting bin or other type of receptacle. In any of these embodiments, if it is desirable, a vibrating device (not shown) can be associated with the filter tubes in order to loosen any of the solid material adhering to their inner surfaces. Generally speaking, however, the filter tubes are nonclogging and the solid material collected therein readily falls away when the tubes are cleared without agitation.

The particular shape of an apparatus according to the invention can, of course, vary. For example in the partial elevational views shown in FIGS. 2 through 5 any suitable support means (not shown) can be employed to support the various elements. Moreover, the apparatus can be of circular construction or square construction or any other suitable shape.

The embodiments described hereinabove present designs which have wide flexibility and permit the handling of a variety of waste problems. The volume and rate of filtration can easily be varied in these embodiments by varying the height of the collection means located above the filter tubes, by varying the size and the material from which the tubes are made, as well as by adding additional collection means and filter tubes in any combination desired. It is also possible by varying these elements to obtain different degrees of dryness of solids or if desired an external drying apparatus (not shown) can be employed to partially dry the solids while they are being moved toward the collecting means at the top of the filter tubes.

The present invention permits recovery of solids which can be reused in plant operations, if desired. The invention also permits reuse of the separated liquid. Moreover, the invention also provides a means for either partial or substantially complete separation of solids and liquids depending upon the desired end result. The various embodiments of this invention as illustrated can be further refined by the addition of the necessary lines and piping as well as pumps suitable for moving both the filtrate and the solids. Numerous other advantages of the invention will be apparent to those skilled in the art.

The foregoing description while it presents certain details for clarity of understanding is not limitative and many modifications of the present invention will be apparent. Accordingly, the invention is not to be limited by the description except as defined in the appended claims.

I claim: 1. A process for separating liquids and solids comprising collecting from a source in a collection zone a material comprising liquids and solids, introducing said material at ambient temperature and pressure into at least one vertically disposed woven cloth filter tube, allowing the solids to sedimentate, flocculate and precipitate by gravity in said woven cloth filter tube and to form a self-filtering medium while at least part of the liquid passes through the wall of and to the outside of said woven cloth filter tube and is separated as filtrate, collecting the filtered liquid in one collection zone and simultaneously the separated solids in another collection zone positioned below said filter tube.

2. Apparatus for separating liquids and solids comprising vertically disposed filtering means having open upper and lower extremities, means for collecting material to be separated adjacent the upper extremities and cooperating therewith for introduction of material into said filtering means, collection means disposed adjacent the lower extremities for collecting liquid filtrate and collection means positioned below said filtering means and in association therewith to receive separated solid material from said filtering means, the collection means for the separated solid material including hinged dump chutes disposed in an inclined position and receiving both filtrate and solids material from said filtering means, the lower end of the inclined dump chutes being located adjacent an opening to permit passage of liquid filtrate to the filtrate collecting means and to permit separated solid material to be dropped toward the bottom of said collection means when said dump chutes are in their lowermost position.

3. Apparatus as defined in claim 2 wherein a scraper blade is disposed in the lower end of said collection means for the solid material.

4. Apparatus for separating liquids and solids comprising a plurality of vertical support members, a trough having an inlet and an overflow outlet located at the upper end of said support members, the bottom of said trough having a plurality of openings therein, a plurality of woven cloth filter tubes suspended from the openings in the bottom of said trough and extending downwardly to cooperate with a second trough supported near the lower ends of said woven cloth filters, flat closure members disposed across the bottom extremities of the filters forming a closure therefor, the flat closure members having bosses at each end, cam locks adapted to pivot on the sides of said lower trough, the bosses of said closure members riding on the camming surfaces of said cam locks and said cam locks being joined together by a connecting bar thereby operating in unison, a handle connected to at least one of each pair of joined cam locks and a collecting means disposed below said lower trough to receive material collected in said woven filter tubes.